United States Patent [19]

Muller et al.

[11] 4,383,920

[45] May 17, 1983

[54] MOBILE FLUID PURIFICATION SYSTEM

[75] Inventors: Richard S. Muller, Richmond; Richard C. Dickerson, Virginia Beach, both of Va.

[73] Assignee: Ecolochem, Inc., Norfolk, Va.

[21] Appl. No.: 268,382

[22] Filed: May 29, 1981

[51] Int. Cl.³ .............................................. C02F 9/00
[52] U.S. Cl. ....................................... 210/87; 210/93; 210/96.1; 210/241; 210/264; 210/284
[58] Field of Search .............. 210/662, 663, 669, 670, 210/675, 85, 87, 90, 93, 96.1, 241, 264, 269, 284, 314, 335, 340

[56] References Cited

U.S. PATENT DOCUMENTS

| | | |
|---|---|---|
| 2,938,868 | 5/1960 | Carlson et al. ....................... 210/662 |
| 3,630,365 | 12/1971 | Woodbridge et al. .............. 210/241 |
| 4,155,846 | 5/1979 | Novak et al. ........................ 210/264 |

*Primary Examiner*—Ivars C. Cintins
*Attorney, Agent, or Firm*—Lane, Aitken & Kananen

[57] ABSTRACT

A mobile system for purifying liquids, such as water, including a truck trailer in which multiple purification treatment tanks are mounted. The system includes an inlet, an outlet, conductivity measuring equipment for monitoring the quality of the purified liquid, and specially designed liquid conduits and valves which permit the treatment tanks to be operated in series, in parallel, or in series/parallel. The treatment tanks can be filled with any desired purification material. The trailer is enclosed and heated to protect the system from cold temperatures.

18 Claims, 1 Drawing Figure

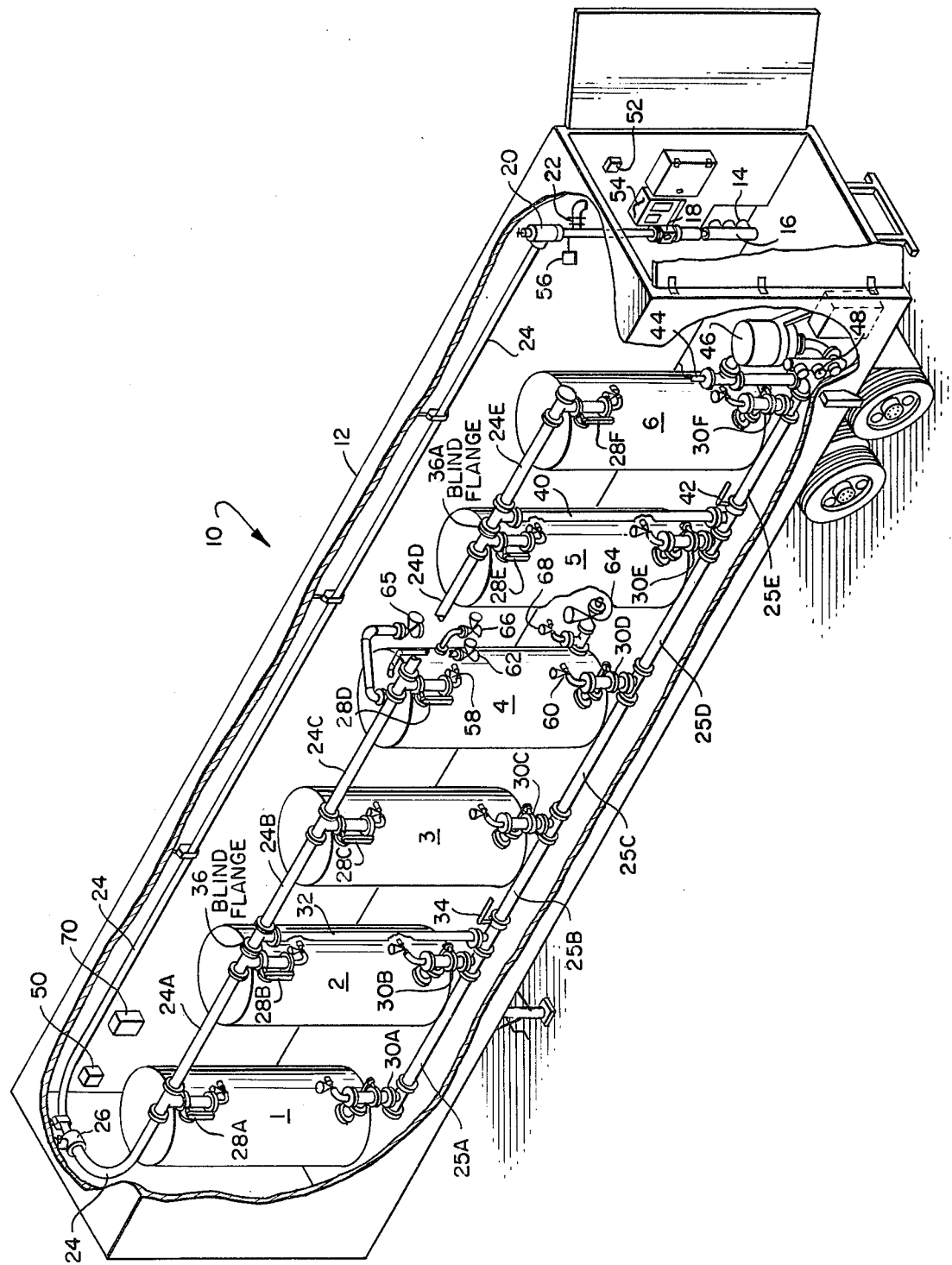

MOBILE FLUID PURIFICATION SYSTEM

BACKGROUND OF THE INVENTION

1. Field of the Invention

The invention is in the field of liquid purification or separation apparatus. More particularly, the invention relates to a mobile liquid purification system.

2. Description of the Prior Art

The prior art includes U.S. Pat. No. 4,049,548 to Dickerson which discloses a mobile demineralizer for water treatment having two successive banks of mixed-bed ion exchange resin cylinders which produce extremely high quality water.

Experience has shown that the mixed-bed ion exchange resin cylinders used in the mobile demineralizer of that earlier patent produce a water quality that may be much higher in quality than many industrial water purification customers require, thus creating an economic and chemical inefficiency. Furthermore, the ion exchange resin cylinders used in that invention cannot be regenerated in situ, but must be disconnected and removed from the mobile demineralizer and transported to a regeneration station.

SUMMARY OF THE INVENTION

The present invention provides a mobile liquid purification system with a multiplicity of purification treatment tanks which can be connected in parallel, in series, or in parallel/series configuration. Each of the treatment tanks can be filled with one or more purification treatment materials selected from among the multiplicity of available purification materials. Accordingly, the inventive system can be precisely tailored to the needs of each industrial liquid purification customer. The invention has the capability of removing the purification materials from the treatment tanks without removing the tanks from the mobile unit, and it also has the further capability of regenerating the purification materials in situ without removing them from the treatment tanks if desired.

The invention is a mobile liquid purification system including (1) a vehicle; (2) a set of three or more liquid purification treatment tanks mounted in the vehicle, each of the treatment tanks containing a liquid purification treatment material, and each of the treatment tanks having a liquid inlet, a liquid outlet, a purification treatment material inlet, and a purification treatment material outlet; (3) a system inlet to be connected to a source of raw liquid to be purified; (4) a system outlet for delivering purified liquid; (5) liquid conduits and valves for conveying the raw liquid from the system inlet to the treatment tanks, between the treatment tanks, and from the treatment tanks to the system outlet, the conduits and valves being selectively connected to the treatment tanks so that the treatment tanks can operate in a series mode, in a parallel mode, or in a series/parallel mode; and, (6) measuring apparatus which monitors the quality of the purified liquid output.

BRIEF DESCRIPTION OF THE DRAWING

The drawing is a perspective view of a mobile water purification system constructed in accordance with the principles of the invention.

DESCRIPTION OF THE PREFERRED EMBODIMENTS

The mobile liquid purification system of the present invention is capable of being precisely tailored to the needs of the particular industrial liquid purification job by virtue of the fact that the system can be configured in a multitude of operating modes. A preliminary chemical analysis of the raw liquid is performed and on the basis of that analysis the mobile system is configured in such a way as to satisfy the job requirements. Quality control is assured through the supervision of field operators who preferably remain with the mobile system when it is in service.

The drawing and the following description illustrate a specific working example of the invention in the field of water purification. The drawing shows a standard truck trailer 12 in which six water purification treatment tanks 1-6 are permanently mounted. The trailer 12 is eight feet wide and forty-three feet long. Each of the treatment tanks is six feet in diameter, has a shell height of five feet, and will hold up to one hundred and fifteen cubic feet of purification treatment material.

Raw water is received from the customer's source via $2\frac{1}{2}''$ water inlet connections 14. Access to these connections is through an access door in the side of the trailer. The $2\frac{1}{2}''$ hose nipples are attached to, and are a part of, the outside body of inlet strainer 16. The purpose of this strainer is to prevent foreign bodies from entering the system. After leaving the strainer, the flow is measured in an indicating and recording flow meter 18. From here, the raw water continues through a pressure reducing valve 20. This valve reduces the incoming pressure to that suitable for this system, and will prevent overloads in the system from occurring. A rupture disc 22 is mounted in this inlet piping to protect the system from pressure overload.

The water is then carried the length of the trailer by hose 24, which is preferably 5" rubber hose to permit flexing when the trailer travels over uneven road surfaces. Before reaching the first tank, any entrapped air is released through air release valve 26. This valve serves a dual purpose in that it admits air during the draining of the system to prevent a vacuum from being imposed in the system and it removes air from the system during normal operation.

For the purpose of processing the raw water, six rubber-lined tanks 1-6 are included within the trailer. The number of tanks is not critical, and can be three or more. Six tanks provides an efficient and workable system. The operation of the tanks can be configured in a multitude of ways which is one of the features of this inventive system. Each tank is essentially identical from a mechanical point of view, but to simplify the drawing, all of the valves are not shown in each tank.

In the working example shown in the drawing, the raw water delivered by hose 24 and 24A enters at the top of tanks 1 and 2, which thus operate in parallel, through water inlet valves 28A and 28B, respectively. Incoming water is prevented from continuing to an upper hose 24B by a blind flange 36. The tanks 1 and 2 contain, in this example, commercially-available cation exchange resins which remove cations such as calcium, magnesium, sodium, and potassium ions from the raw water. The water passes down through the cation resin in tanks 1 and 2 in parallel and goes through water outlet valves 30A and 30B, respectively, and into a connecting hose 25A. The water then is diverted up through a crossover hose 32, since the valve 34 is closed.

The tanks 3, 4, and 5 operate in parallel through the use of a crossover hose 32 and the connecting hoses 24B, 24C, and 24D. The tanks 3, 4, and 5 contain, in this example, commercially-available anion exchange resins which remove anions such as sulfate, chloride, bicarbonate, and carbonate ions from the water. The top hoses 24B, 24C, and 24D function as the inlet header to the tanks 3, 4, and 5. The incoming water is prevented from continuing to top hose 24E by a blind flange 36A. Water delivered by hoses 24B, 24C, and 24D enters at the top of the tanks 3, 4, and 5 operating in parallel through inlet valves 28C, 28D, and 28E, respectively. Water passes down through the anion exchange resin in these tanks and exits through outlet valves 30C, 30D, and 30E, respectively.

As shown in the drawing, the outlet valves 30C, 30D, and 30E of tanks 3, 4, and 5 are connected to the lower connecting hoses 25C and 25D. The water is then diverted vertically through a crossover hose 40 by having the valve 42 closed. This diverts the flow into tank 6, which in this example is a mixed-bed ion exchange resin (demineralizer), the flow entering at the top of tank 6 through inlet valve 28F, passing down through the bed inside tank 6, and leaving through the outlet valve as in the previous tanks. At this point, the entire flow from the system goes through the tank 6 and is measured for its quality by a conductivity cell 44. Following this, the flow passes through a resin trap 46, which contains a stainless steel mesh strainer and basket. The purpose of the resin trap 46 is to catch any resin which might leave the system and prevent it from getting into the customer's water system. The purified water leaves the trailer through 2½" water outlet connections 48.

Because of the susceptibility of the system to high or low air temperatures, and to protect the equipment, a high temperature alarm 50 and a low temperature alarm 52 are also provided. The output from the conductivity cell 44 is measured and recorded on the conductivity monitor 54. This monitor has adjustable set points, and should the quality of the water being delivered be below the set point, then the conductivity monitor provides an electrical signal to pressure reducing valve 20, which will cause it to close. At the same time, the system can be arranged to sound an alarm to alert the operator that the water quality is below the set point, and has been shut off. To protect the system from high water temperatures, a temperature measuring and alarm system 56 will sound an alarm and can be connected (if desired) to close inlet 14.

When the tanks are to be regenerated by removing the resins from the system, connections are made to a resin outlet valve 64 in each tank and sluicing water may be added to the tank via regeneration inlet valve 58, vent valve 62, or spray valve 66, depending upon the particular desired result. Should additional sluicing water be required, or should a stoppage in the resin outlet be encountered, additional water may be injected via a valve 68. This same valve will also provide additional sluicing water in the resin out line, if necessary. Spray valve 66 is connected internally with a spray water system which is used in removing the resin from the tanks. Regenerated resin would be replaced in each tank through a resin inlet valve 65 located at the top of each tank.

The foregoing example refers to operation in the mode in which the ion exchange resins are removed from the tanks and regenerated outside of the trailer. Should it be necessary or desirable to regenerate the resins in the tanks, the necessary regenerants are injected through regeneration inlet valve 58 in each tank, and removed from each tank through regeneration outlet valve 60 in each tank. These valves, when connected through the proper sources, and when opened, will allow regeneration chemicals to be injected into and then removed from the tanks. During this regeneration operation, water inlet valves 28A-F and water outlet valves 30A-F must be closed to isolate each tank from the system. A vent valve 62 is provided in each tank to relieve air which may be in the tanks when they are filled, and to add air when draining. It is also a way of adding additional water to the tanks.

The configuration described in the foregoing example represents the use of the system when tanks 1 and 2 are used in parallel as cation exchangers, tanks 3, 4, and 5 are used in parallel as anion exchangers, and tank 6 is used as a mixed-bed cation and anion exchanger. One of the features of this system is complete flexibility of use. For example, it may be desirable to have three cation tanks and three anion tanks, and no mixed-bed tanks. In such a configuration, crossover hose 32, valve 34, and blind flange 36 would be removed from between tanks 2 and 3 and these components would be placed between tanks 3 and 4. At the same time, blind flange 36A, located between tanks 5 and 6, would be removed. This would then put tanks 1, 2, and 3 in parallel operation with their total flow in series with tanks 4, 5, and 6, which would then also be in parallel operation.

It is also possible by other changes in piping, to utilize one or more of the tanks as sand filters for the removal of suspended material, to use them as activated carbon filters ahead of a demineralizer system, or for uses other than demineralization. For example, the equipment could be used with all six tanks in parallel (i.e., with no crossover hoses) as a six tank sodium zeolite softener. This system, by virtue of its flexibility, could also be used for other special applications whereby ion exchange resins (scavenging resins) are used for the removal of ions from a solution.

The following table illustrates some of the modes in which the system may be configured and operated:

| | TANK NO. | | | | | | |
|---|---|---|---|---|---|---|---|
| | 1 | 2 | 3 | 4 | 5 | 6 | MODE OF OPERATION |
| | Treatment Material(s): | | | | | | |
| (a) | sand | sand | sand | sand | sand | sand | all tanks in parallel |
| (b) | activated carbon | activated carbon | activated carbon | activated carbon | activated carbon | activated carbon | all tanks in parallel |
| (c) | cation | cation | cation | cation | cation | cation | all tanks in parallel |
| (d) | cation/ anion | cation/ anion | cation/ anion | cation/ anion | cation/ anion | cation/ anion | all tanks in parallel |
| (e) | scavenging resin | scavenging resin | scavenging resin | scavenging resin | scavenging resin | scavenging resin | all tanks in parallel |

-continued

| | TANK NO. | | | | | MODE OF OPERATION |
|---|---|---|---|---|---|---|
| 1 | 2 | 3 | 4 | 5 | 6 | |
| (f) cation | cation | anion | anion | anion | cation/anion | parallel/series: tanks 1 and 2 in parallel; tanks 3, 4, and 5 in parallel; tank 6 in series |
| (g) cation | cation | cation | cation | anion | anion | parallel/series: tanks 1, 2, and 3 in parallel; tanks 4, 5 and 6 in parallel |
| (h) cation | cation | anion | anion | cation/anion | cation/anion | parallel/series: tanks 1 and in parallel; tanks 3 and 4 in parallel; tanks 5 and 6 in parallel |
| (i) cation | weak base anion | strong base anion | cation/anion | not used | not used | all tanks in series |

The ability of the system to be regenerated in place was described earlier. It can also, by virtue of its design, be backwashed in place prior to regeneration. In this case, backwash water would be admitted through valve 60 and removed through valve 58 or through valve 65.

Since ion exchange resins are susceptible to rapid deterioration at low temperatures, the entire trailer is insulated and heated. A gas heater 70, mounted in the forward end of the trailer, is provided to maintain the temperature above 35° F. under the most extreme outside temperature conditions, even down to −20° F.

All of the valves have not been shown in the drawing for simplicity. For example, valves 58, 60, 65, 66, 62, 64, and 68 are identical on each tank.

The important features of the inventive system are that it is very flexible in its use, that is, it has a variety of applications through not only piping flexibility, but also because of the number of tanks and the various combinations of resin which they can contain. Not only is this system suitable as mentioned above for use with resins, but for any other water treatment processes which require a pressure vessel and the passing of the water through a fixed bed of material, whether that material be sand, activated carbon, ion exchange resin, or a special catalyst that is used in some highly specific industry.

In this system, all of the tanks are interconnected using hose. The reason for this is to prevent possible difficulties with the piping system if it were to be connected with rigid pipe. The trailer will deform slightly and hose is used so that each tank is individual and can move independently of the others without damage to itself or to the other tanks. Further, by use of flanged piping, the piping can be rearranged to allow the use of the tanks in series, in parallel, or in series/parallel. The trailers are strengthened to withstand this type of load.

The above-described embodiments are intended to be illustrative, not restrictive. The full scope of the invention is defined by the claims, and any and all equivalents are intended to be embraced.

What is claimed is:

1. A mobile liquid purification system comprising:
   (1) a vehicle;
   (2) a set of three or more liquid purification treatment tanks mounted in said vehicle, each of said treatment tanks containing a liquid purification treatment material, each of said treatment tanks further having a liquid inlet, a liquid outlet, a purification treatment material inlet, and a purification treatment material outlet;
   (3) a system inlet means adapted to be connected to a source of raw liquid to be purified;
   (4) a system outlet means for delivering purified liquid;
   (5) liquid conduit and valve means for conveying said raw liquid from said system inlet means to said treatment tanks and between said treatment tanks and from said treatment tanks to said system outlet means, said conduit and valves means being selectively connected to said treatment tanks whereby said treatment tanks are capable of being operated: (a) in series, (b) in parallel, (c) in series/parallel mode, and, (d) in parallel/series mode; and,
   (6) measuring means for monitoring the quality of the purified liquid output.

2. The mobile liquid purification system of claim 1 wherein said vehicle is enclosed and has an interior heating means.

3. The mobile liquid purification system of claim 1 wherein said liquid is water.

4. The mobile liquid purification system of claim 1 wherein said liquid purification treatment materials are selected from the group consisting of anion exchange resins, cation exchange resins, mixed anion and cation exchange resins, sand, activated carbon and scavenging resins.

5. The mobile liquid purification system of claim 1 wherein said system includes an inlet strainer, a flow meter, a water temperature alarm, a pressure reducing valve, an air temperature alarm, an air release valve, and an outlet strainer.

6. The mobile liquid purification system of claim 1 wherein each of said treatment tanks further includes a regeneration liquid inlet and a regeneration liquid outlet, whereby the purification treatment material in each of said treatment tanks is capable of being regenerated in situ.

7. A mobile liquid purification system comprising:
   (1) a vehicle;
   (2) a set of three or more liquid purification treatment tanks mounted in an adjacent upright position in said vehicle, each of said treatment tanks containing a liquid purification treatment material, each of said tanks further having a liquid inlet, a liquid outlet, a purification treatment material inlet, and a purification treatment material outlet;
   (3) a system inlet means adapted to be connected to a source of raw liquid to be purified;
   (4) a system outlet means for delivery purified liquid;
   (5) a first liquid conduit means for conveying said raw liquid, said first liquid conduit means being connected to said system inlet means and to the first of said treatment tanks;
   (6) a second liquid conduit means, said second liquid conduit means being selectively connected between: (a) said first liquid conduit means and the liquid inlet of the second of said treatment tanks whereby said first treatment tank and said second treatment tank are capable of being operated in parallel; and, (b) the liquid outlet of said first treatment tank and the liquid inlet of said second treatment tank whereby said first treatment tank and said second treatment tank are capable of being operated in series;

(7) a third liquid conduit means, said third liquid conduit means being selectively connected between: (a) said second liquid conduit means and the liquid inlet of the third of said treatment tanks whereby said second treatment tank and said third treatment tank are capable of being operated in parallel; and, (b) the liquid outlet of said second treatment tank and the liquid inlet of the third of said treatment tanks whereby said second treatment tank and said third treatment tank are capable of being operated in series;

(8) a fourth liquid conduit means connecting the liquid outlet of said third treatment tank and said system outlet means; and, (9) measuring means for monitoring the quality of the purified liquid.

8. The mobile liquid purification system of claim 7 wherein said vehicle is enclosed and has an interior heating means.

9. The mobile liquid purification system of claim 7 wherein said liquid is water.

10. The mobile liquid purification system of claim 7 wherein said liquid purification treatment materials are selected from the group consisting of anion exchange resins, cation exchange resins, mixed anion and cation exchange resins, sand, activated carbon, and scavenging resins.

11. The mobile liquid purification system of claim 7 wherein said system includes an inlet strainer, a flow meter, a water temperature alarm, a pressure reducing valve, an air temperature alarm, an air release valve, and an outlet strainer.

12. The mobile liquid purification system of claim 7 wherein each of said treatment tanks further includes a regeneration liquid inlet and a regeneration liquid outlet, whereby the purification treatment material in each of said treatment tanks is capable of being regenerated in situ.

13. A mobile liquid purification system comprising:
(1) a vehicle;
(2) a set of six liquid purification treatment tanks mounted in an adjacent upright position in said vehicle, each of said treatment tanks containing a liquid purification treatment material, each of said tanks further having a liquid inlet, a liquid outlet, a purification treatment material inlet, and a purification treatment material outlet;
(3) a system inlet means adapted to be connected to a source of raw liquid to be purified;
(4) a system outlet means for delivering purified liquid;
(5) a first liquid conduit means for conveying said raw liquid, said first liquid conduit means being connected to said system inlet means and to the first of said treatment tanks;
(6) a second liquid conduit means, said second liquid conduit means being selectively connected between: (a) said first liquid conduit means and the liquid inlet of the second of said treatment tanks whereby said first treatment tank and said second treatment tank are capable of being operated in parallel; and, (b) the liquid outlet of said first treatment tank and the liquid inlet of said second treatment tank whereby said first treatment tank and said second treatment tank are capable of being operated in series;

(7) a third liquid conduit means, said third liquid conduit means being selectively connected between: (a) said second liquid conduit means and the liquid inlet of the third of said treatment tanks whereby said second treatment tank and said third treatment tank are capable of being operated in parallel; and, (b) the liquid outlet of said second treatment tank and the liquid inlet of the third of said treatment tanks whereby said second treatment tank and said third treatment tank are capable of being operated in series;

(8) a fourth liquid conduit means, said fourth liquid conduit means being selectively connected between: (a) said third liquid conduit means and the liquid inlet of the fourth of said treatment tanks whereby said third treatment tank and said fourth treatment tank are capable of being operated in parallel; and, (b) the liquid outlet of said third treatment tank and the liquid inlet of the fourth of said treatment tanks whereby said third treatment tank and said fourth treatment tank are capable of being operated in series;

(9) a fifth liquid conduit means, said fifth liquid conduit means being selectively connected between: (a) said fourth liquid conduit means and the liquid inlet of the fifth of said treatment tanks whereby said fourth treatment tank and said fifth treatment tank are capable of being operated in parallel; and, (b) the liquid outlet of said fourth treatment tank and the liquid inlet of the fifth of said treatment tanks whereby said fourth treatment tank and said fifth treatment tank are capable of being operated in series;

(10) a sixth liquid conduit means, said sixth liquid conduit means being selectively connected between: (a) said fifth liquid conduit means and the liquid inlet of the sixth of said treatment tanks whereby said fifth treatment tank and said sixth treatment tank are capable of being operated in parallel; and, (b) the liquid outlet of said fifth treatment tank and the liquid inlet of the sixth of said treatment tanks whereby said fifth treatment tank and said sixth treatment tank are capable of being operated in series;

(11) a seventh liquid conduit means connecting the liquid outlet of said sixth treatment tank and said system outlet means; and,

(12) measuring means for monitoring the quality of the purified liquid.

14. The mobile liquid purification system of claim 13 wherein said vehicle is enclosed and has an interior heating means.

15. The mobile liquid purification system of claim 13 wherein said liquid is water.

16. The mobile liquid purification system of claim 13 wherein said liquid purification treatment materials are selected from the group consisting of anion exchange resins, cation exchange resins, mixed anion and cation exchange resins, sand, activated carbon, and scavenging resins.

17. The mobile liquid purification system of claim 13 wherein said system includes an inlet strainer, a flow meter, a water temperature alarm, a pressure reducing valve, an air temperature alarm, an air release valve, and an outlet strainer.

18. The mobile liquid purification system of claim 13 wherein each of said treatment tanks further includes a regeneration liquid inlet and a regeneration liquid outlet, whereby the purification treatment material in each of said treatment tanks is capable of being regenerated in situ.

* * * * *